UNITED STATES PATENT OFFICE.

CARL A. NOWAK, OF ST. LOUIS, MISSOURI.

PROCESS OF BREWING BEER AND LOW-ALCOHOLIC MALT BEVERAGES.

1,328,888.      Specification of Letters Patent.      Patented Jan. 27, 1920.

No Drawing.      Application filed February 13, 1918. Serial No. 216,960.

*To all whom it may concern:*

Be it known that I, CARL A. NOWAK, a citizen of the United States, residing at St. Louis, in the county of St. Louis and State of Missouri, have invented certain new and useful Improvements in Processes of Brewing Beer and Low-Alcoholic Malt Beverages, of which the following is a specification.

My invention relates to a process of brewing beer and low alcoholic beverages.

In the manufacture of beer or malt beverages, from a low gravity wort (about 8 to 10% Balling), such as are now required, by the present laws or regulations, certain difficulties are encountered. Foremost among these difficulties is that these liquids contain a relatively small proportion of proteid bodies, which cause the yeast used for fermentation to rapidly deteriorate, requiring frequent changes of yeast. As these worts have a low acidity, the beers obtained therefrom are of less acidity, and consequently have a lower keeping quality.

The objects of my invention are, to render the soluble proteid bodies contained in the beer or malt beverage more permanently soluble and to prevent their possible reversion into the soluble state, precipitate the colloidal proteid bodies which frequently cause disturbances when the beer or malt beverage is bottled and pasteurized which results in the haziness of the product, and increase the acidity of the product and furnish at the same time nutrient salts for the healthy propagation of the yeast in the low gravity wort solutions.

In practising the process embodying my invention, I add to the beer or malt beverage, preferably after the same has been fermented or after it is contained in the "chip cask" or "storage vat" or after the yeast has been removed by sedimentation, a suitable amount of meta phosphoric or ortho phosphoric acid or other phosphoric acids or acid phosphates. The exact manner of operation depends upon the acid employed, and the amount of acid employed, depending both upon the strength of such acid and the specific gravity of the beverage, and also upon the nitrogen or proteid content of the beverage or beer.

The following is an example of a preferred embodiment in the practice of my process:

The mashing, kettle and fermentation operations being carried out in a customary manner to produce the beer or malt beverage, I add two pounds of meta phosphoric acid, previously dissolved or diluted with about one-half barrel of water, to the beverage, for every one hundred barrels of the beverage, and this addition is made at the time that the beverage is being conveyed from the fermenter or cask in which the fermentation has taken place, to the "storage cask" or "chip cask". During this operation a uniform and intimate mixture of the meta phosphoric acid and beverage is effected, in order that the acid may be uniformly distributed throughout the entire volume of the beverage or liquid, and may thus act uniformly upon the entire volume of such liquid. This thorough and intimate mixture of the mass is absolutely essential for the reason that (especially when the meta phosphoric acid is employed) the reaction between the phosphoric acid and the beverage would otherwise be localized, caused by the precipitate formed by such reaction, and the remainder of the beverage would not be materially acted upon or benefited. After this treatment it will be found that the beverage contains a precipitate, which is allowed to settle, and may be separated out by filtration or the like.

It is a well known fact that meta phosphoric acid ($HPO_3$) is differentiated from other phosphoric acids, such as ortho and pyro phosphoric acid, by its reaction with the albumen, forming an insoluble precipitate. This is the precipitate above referred to, and I make use of this reaction in removing from the beverage the colloidal proteid substances, which frequently lead to turbidities after the beer or beverage is bottled. The removal of the small portion of the proteins, especially those of unstable character, by the precipitative action of the meta phosphoric acid, will preclude all possibilities of subsequent turbidity occurring in the beverage, caused by chilling or subjecting the beverage or beer to adverse conditions. The beer or beverage produced in accordance with the practice of my process will not require the addition of any stabilizing compound, such as a photeolytic enzym, which is generally employed for the purpose of rendering beers resistant to the influence of extremely low temperatures.

When the preferred acid is employed, to wit, meta phosphoric acid, the precipitate which is formed is permitted to settle by a process of slow sedimentation, and is subsequently removed by means of filtration. In this manner, the proteid bodies, which frequently cause turbidities in the finished beverage, are effectively removed.

In some instances I may employ either meta or ortho phosphoric acid, or a mixture thereof, or these acids may be used in conjunction with other acid phosphates. These compounds may be added to the beverage at any stage of the brewing process after the completion of the mashing operation or step. In some instances, I may add one pound of ortho phosphoric acid to one hundred barrels of the wort or beverage in the kettle, and then add one pound of meta phosphoric acid to the mass in the storage vat. The addition of the ortho phosphoric acid in the kettle serves to supply nutriment for the yeast, and also decomposes the carbonates, which are objectionable. The addition of the meta phosphoric acid or its salts in the storage vat, after the yeast has been separated out, will result in the precipitation of the unstable colloidal substances, which are removed by filtration, and which cause turbidity of the beer or beverage, as above indicated.

In the case of a malt beverage containing less than one-half per cent. of alcohol by volume, and in which it is not necessary to supply nutriment for the yeast, the addition of the meta phosphoric acid is made in the storage cask, it being important that an intimate mixture be rapidly effected.

Where it is desirable for economical reasons, to employ any of the other phosphoric acids or acid phosphates, which do not possess the property of coagulating proteins, the beer or beverage contained in the storage vat, is cooled for a period of one week, at a temperature of about 30° F., at which temperature the more unstable proteids will precipitate out. This precipitate is allowed to settle and is preferably removed by filtration, subsequently to which the phosphoric acid or acid phosphate, may be added, in the proportions specified.

The amount of meta phosphoric acid or other phosphoric acids or acid phosphates, to be employed, is determined by the specific gravity of the wort and its proteid content, and it is obvious that the proportions may be widely varied.

It is to be understood that the form of my invention herewith shown and described is to be taken as a preferred example of the same, and that various changes may be resorted to in the proportions of the ingredients employed, and in the order of the steps of the process.

Having thus described my invention, I claim:

1. The herein described process of brewing beer consisting in adding an acid forming a normal constituent of beer to the wort in the presence of the yeast for supplying a nutriment for the yeast and decomposing the carbonate contained in the wort, and subsequently adding to the fermented beer an acid which precipitates the albumen of the beer and which acid subsequently due to the action of the water contained in the beer is hydrated to a normal constituent thereof, and separating out the precipitate.

2. The herein described process of brewing beer, which consists in adding ortho phosphoric acid to the wort in the presence of the yeast for supplying a nutriment for the yeast and decomposing the carbonate contained in the wort, and subsequently adding to the wort of fermented beer meta phosphoric acid whereby the albumen contents of the beer is precipitated, and separating out the precipitate.

In testimony whereof I affix my signature in presence of two witnesses.

CARL A. NOWAK.

Witnesses:
HELEN HOTFELDER,
HARRY J. CRADEN, Jr.